United States Patent [19]

Fraser

[11] Patent Number: 5,029,011
[45] Date of Patent: Jul. 2, 1991

[54] ENGRAVING APPARATUS WITH OSCILLATORY MOVEMENT OF TOOL SUPPORT SHAFT MONITORED AND CONTROLLED TO REDUCE DRIFT AND VIBRATION

[75] Inventor: John W. Fraser, Dayton, Ohio

[73] Assignee: Ohio Electronic Engravers, Inc., Dayton, Ohio

[21] Appl. No.: 509,281

[22] Filed: Apr. 13, 1990

[51] Int. Cl.$^5$ .......................... B41C 1/02; B23C 1/16
[52] U.S. Cl. ..................................... 358/299; 409/208
[58] Field of Search ................ 358/299; 409/201, 204, 409/207, 208, 210, 211, 214, 216, 228, 229

[56] References Cited

U.S. PATENT DOCUMENTS

| | | |
|---|---|---|
| 3,964,382 | 6/1976 | Baar et al. |
| 4,013,831 | 3/1977 | Dolves et al. |
| 4,259,697 | 3/1981 | Doelves |
| 4,357,633 | 11/1982 | Buechler |
| 4,438,460 | 3/1984 | Buechler |
| 4,450,486 | 5/1984 | Buechler |
| 4,451,856 | 5/1984 | Buechler |
| 4,500,929 | 2/1985 | Buechler |

Primary Examiner—Benjamin R. Fuller
Assistant Examiner—Scott A. Rogers
Attorney, Agent, or Firm—Killworth, Gottman, Hagan & Schaeff

[57] ABSTRACT

An engraving apparatus for engraving the outer surface of a cylinder used in a gravure printing process includes an engraving stylus mounted onto a shaft for engraving the surface of the cylinder. A drive mechanism is employed for producing angular movement of the shaft and the stylus aboout the central axis of the shaft. A position sensor comprising a light beam illuminator and a light beam detector is associated with the shaft to sense the angular movement of the shaft and produce a shaft position signal representative thereof. A reference signal generator is employed for producing a reference drive signal and a video signal generator is used to produce a video drive signal representative of the information to be engraved into the surface of the cylinder. A feedback control is employed which is responsive to high frequency portions of the video signal, the reference drive signal and the shaft position signal, and generates a corrected drive signal including a correction for any variations in the amplitude of the angular oscillatory movement of the shaft. The corrected drive signal and the video signal are then combined and supplied to an engraver driver which produces an engraver drive signal for actuating the drive mechanism. The engraving apparatus may further include an electronic damping mechanism connected to the position sensor and responsive to the shaft position signal for generating a negative feedback signal to the engraver driver to provide damping for the shaft and the engraving tool.

23 Claims, 5 Drawing Sheets

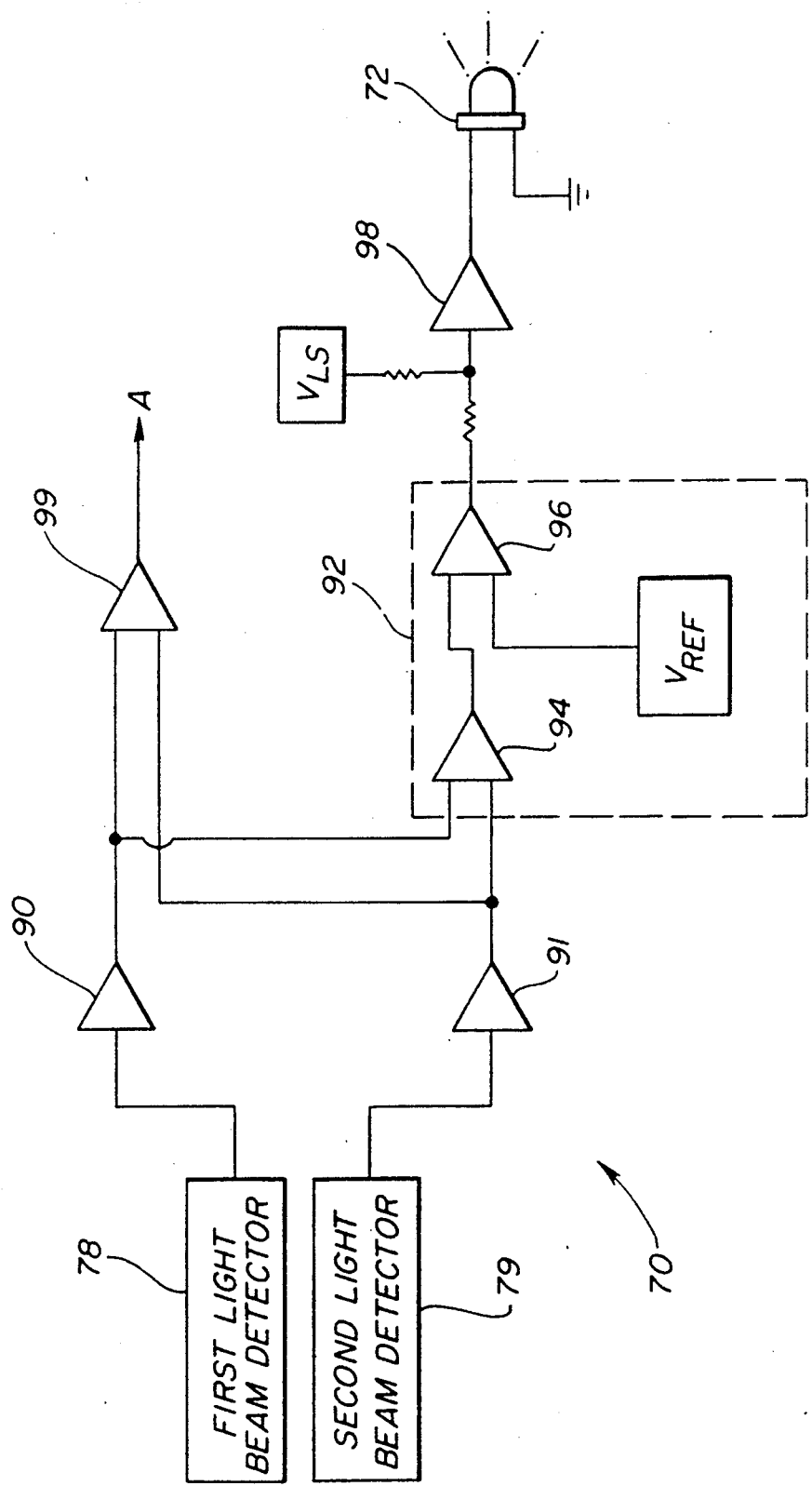

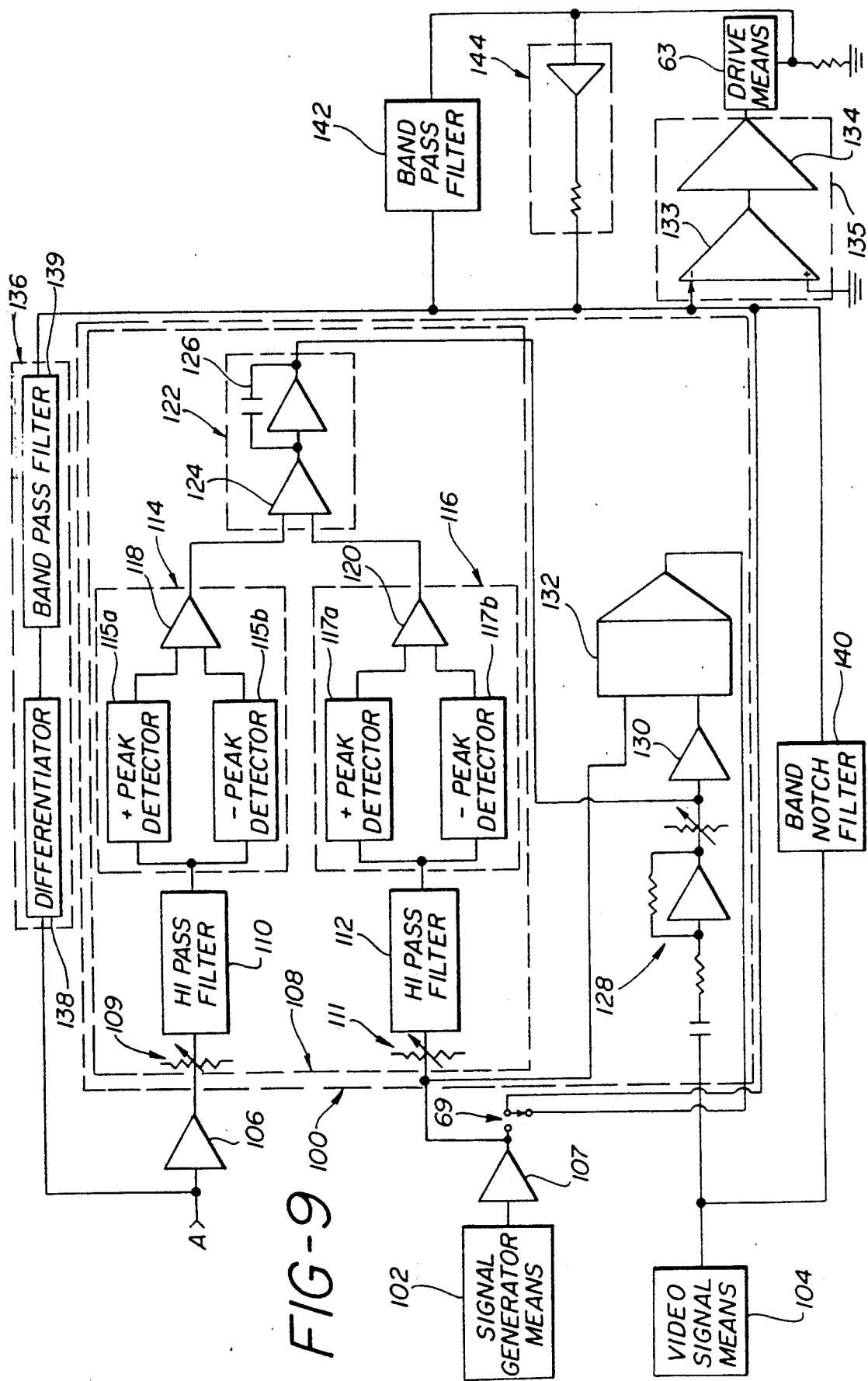

ENGRAVING APPARATUS WITH OSCILLATORY MOVEMENT OF TOOL SUPPORT SHAFT MONITORED AND CONTROLLED TO REDUCE DRIFT AND VIBRATION

BACKGROUND OF THE INVENTION

The present invention generally relates to engraving apparatus having a shaft with a stylus thereon for engraving cylinders commonly used in a gravure printing process and, more particularly, to an improved engraving apparatus including a control system for controlling the movement of the shaft and the engraving stylus and electronically damping the same.

Apparatus for engraving cylinders used in the gravure printing process are well known in the prior art. See, for example U.S. Pat. Nos. 4,451,856; 4,450,486; 4,438,460; and 4,357,633. The basic principle of engraving a gravure cylinder involves rotating a copper plated cylinder while actuating an electrically driven shaft having a tool or stylus thereon which cuts or engraves cells or lines into the copper surface. The engraving tool used to engrave the cells is normally a pointed diamond stylus. Other tools made of sapphire, carbide, cobalt steel, may also be used, but generally give shorter life, and due to wear, do not hold as consistent a point as diamond.

In the engraving of a gravure cylinder, an image pattern or information to be engraved is usually mounted on a copy cylinder, and the information is optically scanned when the engraving is being performed and sent to the engraving apparatus as a video signal. However, the information may be scanned and stored in computer memory, processed, and later used to engrave a cylinder.

During engraving, the video signal is superimposed with a drive signal of a substantially constant frequency to create an engraver drive signal for actuating the electrically driven shaft associated with the cutting stylus. The drive signal causes an angular oscillatory movement of the stylus to form or cut a succession of depressions which are referred to as cups or cells in the surface of the cylinder. The video signal, which is an indication of the measured density of each particular portion of the pattern being reproduced, will determine the cutting depth of the engraving stylus while forming each cell. Thus, during scanning of the pattern, a black part has a large density and will produce a video signal that will cause the engraving stylus to produce a deep cell. However, a white portion of the pattern will have little density and result in a video signal which will control the engraving stylus to produce a shallow cell.

While engraving, the stylus must make many cells in a cylinder, and therefore, must be operated at a very high speed. For example, in a typical 140 line screen, about 20,000 cells per square inch are required. More than 100 million cells are frequently required for a single large diameter gravure printing cylinder. Even with a forming rate of about 3,000 to 5,000 cells per second, several hours of time may be required to engrave a single cylinder.

During the engraving of a cylinder, variables associated with the operation of the engraving stylus can affect the amplitude of the angular oscillatory movement of the stylus resulting in variations in its performance. These variables may include: continuous changes in the loading, and hence, the cutting depth of the stylus; differences in hardness along the surface of the material being engraved; temperature changes in the magnetic drive mechanism resulting in a change in the magnetic field created therein; and, the affect of damping material employed with the engraving stylus. Variations in the amplitude of the angular oscillatory movement of the engraving stylus can cause "drift" of the engraving stylus resulting in the cells slowly becoming larger or smaller. As a consequence, the quality of the engraving performed by the stylus deteriorates.

Engraving apparatus in the prior art have not been capable of sensing and correcting such variations in the amplitude of the angular oscillatory movement of the engraving stylus. For this reason, a need exists for an engraving apparatus which employs a control system for sensing and correcting variations in the amplitude of the angular oscillatory movement of an engraving stylus.

Dampeners have been employed in the prior art for reducing undesirable transverse and rotational vibrations in the driven shaft and the stylus of an engraving apparatus. See for example, U.S. Pat. No. 4,438,460. It has been found, however, that at high speeds, the viscosity of the material comprising at least a portion of the dampener tends to change as the absorbed vibrational energy is converted to heat. As a result, the damping performed by the dampener tends to change as the viscosity of the material changes due to its rise in temperature. Accordingly, a further need exists for an engraving apparatus which employs a damping means which will have a substantially constant damping effect regardless of the speed at which the engraving stylus is operated.

SUMMARY OF THE INVENTION

These needs are met by the engraving apparatus of the present invention wherein angular oscillatory movement of a shaft supporting an engraving stylus is monitored and controlled to substantially eliminate variations which would otherwise occur in the corresponding movement of the engraving stylus. Further, these needs are met by the engraving apparatus of the present invention wherein undesirable transverse and rotational vibrations in the drive shaft and the stylus are consistently reduced regardless of the speed of operation of the engraving stylus.

Angular shaft movement or stylus arm movement generated in response to a reference signal is monitored to generate a shaft or stylus position signal. The shaft position signal is compared to the reference signal and any differences result in the generation of an error signal. By combining the error signal with the reference signal, a corrected drive signal is generated. The corrected drive signal is in turn combined with a video signal representative of the desired engraved image resulting in a signal used to drive the shaft. Delay inherent in the control system is compensated by AC coupling a portion of the video signal into the error signal before the latter is combined with the reference signal to produce the corrected drive signal. Thus, by employing the control system of the present invention to monitor and control the angular movement of the shaft supporting the engraving stylus, variations which would otherwise occur in the movement of the shaft, and hence the stylus, are substantially eliminated.

The shaft position signal may be further employed by an electronic damping means for providing a negative feedback signal which is combined with the corrected drive signal and the video signal for driving the shaft. The shaft position signal is differentiated to produce a velocity signal which only passes through a bandpass filter centered upon a frequency substantially equal to a first resonant frequency of the shaft. The resulting feedback provides the required damping for the shaft.

In accordance with one aspect of the present invention, an apparatus for engraving a surface of a workpiece is provided and comprises: an engraving tool; shaft means for supporting the tool adjacent the surface, the shaft means having a central axis; drive means for producing angular oscillatory movement of the shaft means about its central axis to effect corresponding oscillatory movement of the engraving tool; signal generator means for generating a reference drive signal; position sensor means associated with the shaft means for sensing the angular movement of the shaft means and generating a shaft position signal representative of the movement; video signal means for producing a video drive signal representative of information to be engraved into the surface; feedback control means connected to the signal generator means and the position sensor means, and responsive to the reference drive signal and the shaft position signal for generating a corrected drive signal; and, engraver driver means connected to the video signal means and the feedback control means and responsive to the video drive signal and the corrected drive signal for producing an engraver drive signal for actuating the drive means.

The position sensor means may comprise: illuminator means positioned adjacent the shaft means for producing a beam of light and directing the beam toward the shaft means; reflector means mounted to the shaft means for receiving the beam of light and reflecting the beam away from the shaft means; light beam detecting means located adjacent the shaft means in the path of the reflected beam of light for determining the position of the beam as it strikes the light beam detecting means and generating first and second light beam position signals representative thereof; and, light beam comparison means connected to the light beam detecting means for comparing the first and second light beam position signals to produce the shaft position signal representative of the angular movement of the shaft means.

The position sensor means may further comprise lens means for gathering and focusing the light beam directed from the illuminator means onto the reflector means and further gathering and focusing the light beam reflected from the reflector means onto the light beam detecting means. The lens means is positioned with the illuminator means and the light beam detecting array means being located on a first side of the lens means and the reflector means being located on a second side thereof. The lens means preferably comprises one convex lens.

The light beam detecting means may comprise: a first light beam detector located in the path of the reflected beam of light for sensing the magnitude of the portion of the light beam which strikes the first light beam detector and generating said first light beam position signal representative thereof, and a second light beam detector located in the path of the reflected beam of light adjacent the first light beam detector for sensing the magnitude of the portion of the light beam which strikes the second light beam detector and generating the second light beam position signal representative thereof.

The light beam detecting means may further comprise: illuminator feedback control means connected to the illuminator means and the first and second light beam detectors for adding the first and second position signals, comparing the added value of the first and second position signals with a predetermined desired value, and controlling the illuminator means such that the added value of the first and second position signals is maintained substantially at the predetermined value.

The feedback control means connected to the signal generator means and the position sensor means preferably comprises: comparison means connected to the signal generator means and the position sensor means for comparing the shaft position signal and the reference drive signal to produce an error signal representative of the difference therebetween, and modulator means connected to the comparison means and the signal generator means for combining the error signal and the reference drive signal to produce the corrected drive signal. The comparison means preferably comprises: first peak-to-peak sensing means connected to the position sensor means for determining the peak-to-peak amplitudes of the shaft position signal and producing a first peak-to-peak signal representative thereof; second peak-to-peak sensing means connected to the signal generator means for determining the peak-to-peak amplitudes of the reference drive signal and producing a second peak-to-peak signal representative thereof; and comparator means connected to the first and second peak-to-peak sensing means for comparing the first and second peak-to-peak signals to produce the error signal.

The apparatus preferably further includes damping feedback means connected to the position sensor means and responsive to the shaft position signal for generating a negative feedback signal to provide damping for the shaft and the engraving tool. The engraver driver means is further connected to the damping feedback means and responsive to the negative feedback signal when it produces the engraver drive signal for actuating the drive means.

In accordance with another aspect of the present invention, an apparatus for engraving a surface of a workpiece is provided and comprises: an engraving tool; shaft means for supporting the tool adjacent the surface, the shaft means having a central axis; drive means for producing angular oscillatory movement of the shaft means about its central axis to effect corresponding oscillatory movement of the engraving tool; signal generator means for generating a reference drive signal; position sensor means associated with the shaft means for sensing the angular movement of the shaft means and generating a shaft position signal representative of the movement; video signal means for producing a video drive signal representative of information to be engraved into the surface; feedback control means connected to the video signal means, the signal generator means and the position sensor means, and responsive to the video drive signal, the reference drive signal and the shaft position signal for generating a corrected drive signal; and, engraver driver means connected to the video signal means and the feedstock control means and responsive to the video drive signal and the corrected drive signal for producing an engraver drive signal for actuating the drive means.

The position sensor means is preferably the same as the position sensor means described above with respect to the first aspect of the present invention.

The feedback control means preferably comprises: comparison means connected to the signal generator means and the position sensor means for comparing the shaft position signal and the reference drive signal to produce an error signal representative of the difference therebetween; feedforward means connected to the video drive means for passing portions of the video signal therethrough; amplifier means connected to the comparison means and the feedforward means for combining the portions of the video signal with the error signal to produce a video corrected error signal; and, modulator means connected to the amplifier means and the signal generator means for combining the video corrected error signal and the reference drive signal to produce the corrected drive signal.

The comparison means is preferably the same as the comparison means described above with respect to the first aspect of the present invention. Further, the apparatus may also include a damping feedback means as described above with respect to the first aspect of the present invention.

In accordance with a further aspect of the present invention, an apparatus for engraving a surface of a workpiece is provided and comprises: an engraving tool; shaft means for supporting the tool adjacent the surface, the shaft means having a central axis; drive means for producing angular oscillatory movement of the shaft means about its central axis to effect corresponding oscillatory movement of the engraving tool; signal generator means for generating a reference drive signal; position sensor means associated with the shaft means for sensing the angular movement of the shaft means and generating a shaft position signal representative of the movement; video signal means for producing a video drive signal representative of information to be engraved into the surface; damping feedback means connected to the position sensor means and responsive to the shaft position signal for generating a negative feedback signal to provide damping for the shaft and the engraving tool; engraver driver means connected to the video signal means, the signal generator means and the damping feedback means and responsive to the video drive signal, the reference drive signal and the negative feedback signal for producing an engraver drive signal for actuating the drive means.

In accordance with still another aspect of the present invention, an apparatus for engraving a surface of a workpiece is provided and comprises: engraving means positioned adjacent said surface; drive means for producing angular oscillatory movement of the engraving means; signal generator means for generating a reference drive signal; position sensor means associated with the engraving means for sensing the angular movement of the engraving means and generating an engraver position signal representative of the movement; video signal means for producing a video drive signal representative of information to be engraved into the surface; feedback control means connected to the signal generator means and the position sensor means, and responsive to the reference drive signal and the engraver position signal for generating a corrected drive signal; and, engraver driver means connected to the video signal means and the feedback control means and responsive to the video drive signal and the corrected drive signal for producing an engraver drive signal for actuating the drive means.

In accordance with still a further aspect of the present invention, an apparatus for engraving a surface of a workpiece is provided and comprises: engraving means positioned adjacent said surface; drive means for producing angular oscillatory movement of the engraving means; signal generator means for generating a reference drive signal; position sensor means associated with the engraving means for sensing the angular movement of the engraving means and generating an engraver position signal representative of the movement; video signal means for producing a video drive signal representative of information to be engraved into the surface; damping feedback means connected to the position sensor means and responsive to the engraver position signal for generating a negative feedback signal to provide damping for the engraving means; engraver driver means connected to the video signal means, the signal generator means and the damping feedback means and responsive to the video drive signal, the reference drive signal and the negative feedback signal for producing an engraver drive signal for actuating the drive means.

Accordingly, it is an object of this invention to provide an engraving apparatus which employs a control system for monitoring and controlling the oscillatory movement of a shaft supporting an engraving stylus to substantially eliminate variations which would otherwise occur in the corresponding movement of the engraving stylus. It is further an object of this invention to provide an engraving apparatus which employs an electronic damping means capable of consistently reducing undesirable vibrations in the drive shaft and the engraving stylus regardless of the speed of operation of the engraving stylus. Other objects and advantages of the invention will be apparent from the following description, the accompanying drawings and the appended claims.

BRIEF DESCRIPTION OF THE DRAWINGS

FIG. 8 is a schematic block diagram illustrating an illuminator feedback control circuit and a light beam comparison circuit associated with the illuminator means and the light beam detecting means of the present invention; and FIG. 9 is a schematic block diagram forming part of the control system of the present invention illustrating a feedback control system for monitoring and controlling the oscillatory movement of the shaft supporting the engraving stylus and illustrating an electronic damping system for reducing vibrations in the drive shaft and the engraving stylus substantially regardless of the speed of operation of the engraving stylus.

DETAILED DESCRIPTION OF THE INVENTION

Figure 1:
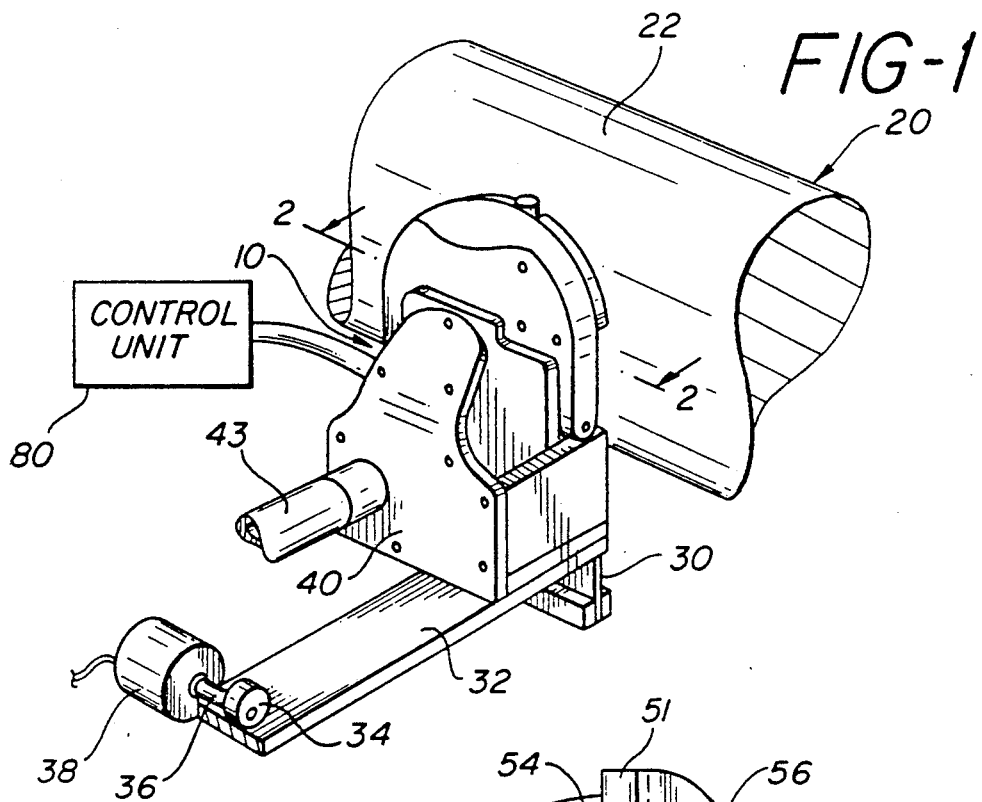
FIG. 1 is a perspective view of an engraving head having a control system associated therewith constructed in accordance with the present invention and illustrating the engraving head's engraving position relative to a cylinder positioned to be engraved.

FIG. 1 shows an engraving head 10 constructed in accordance with the invention and in position for engraving a gravure printing cylinder 20 having a copper coating forming an outer surface 22. The engraving head 10 is supported for tilting movement by a set of leaf springs 30 (only one of which is shown in FIG. 1) which connect the engraving head 10 to a support carriage (not shown) supported for both traversing movement parallel to the axis of the cylinder 20 and transverse movement perpendicular to the axis. A flat bar 32 projects rearwardly from the base of the engraving head 10. A rotary cam member 34 is positioned above the bar 32 and is eccentrically mounted on a shaft 36 of a stepping motor 38. When the motor 38 is energized, the engraving head 10 is slowly moved or tilted toward or away from the cylinder 20. Alternatively, the engraving head 10 may be supported for tilting movement by a pivot means (not shown) which connects the head 10 to the support carriage. The head may be pivoted about the pivot means by, for example, a leadscrew and a pushrod (not shown). The engraving head 10 of the present invention is substantially similar to the one shown in U.S. Pat. No. 4,357,633, the disclosure of which is hereby incorporated by reference.

Figure 2:
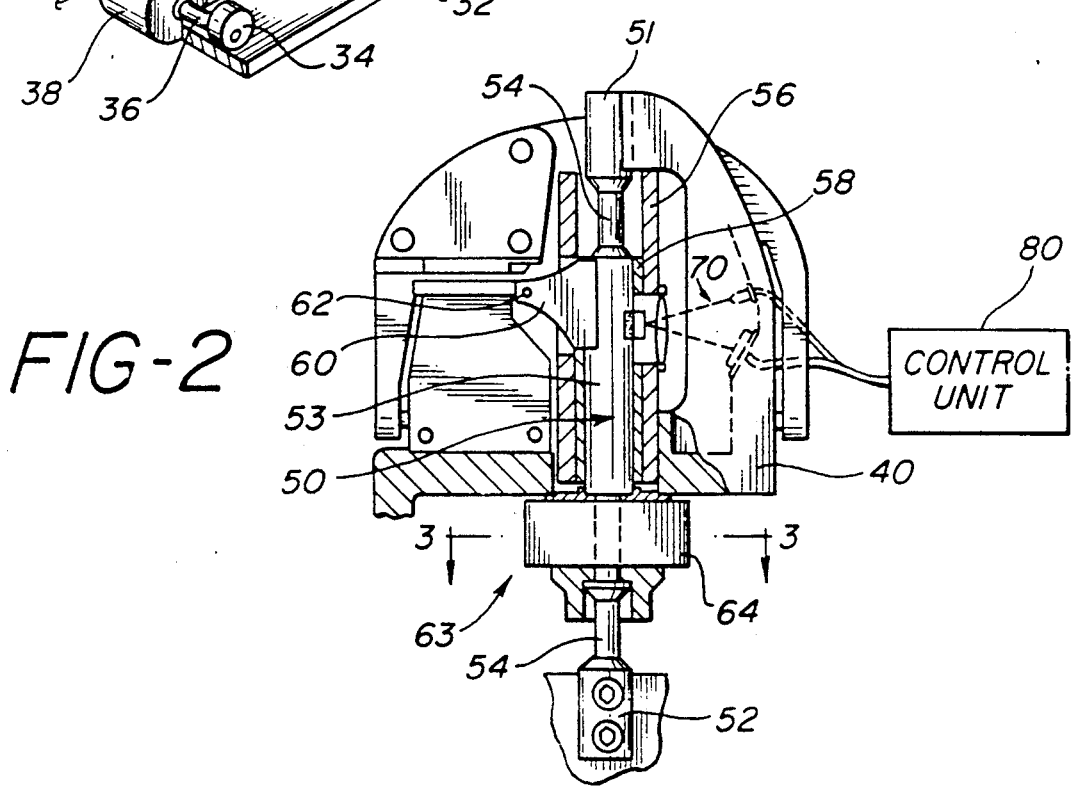
FIG. 2 is an elevational view of the front face of the engraving head of FIG. 1 with a portion shown in section to illustrate internal assembly and showing an illuminator means and a light beam detecting means forming a portion of the control system for the engraving head.

Referring to FIG. 2, the engraving head 10 preferably includes a cast metal housing 40 which rigidly supports opposite end portions 51 and 52 of a shaft 50. The shaft 50 is preferably made from steel and includes an intermediate portion 53 which is integrally connected to the end portions 51 and 52 by torsional spring portions 54 of reduced diameter. The intermediate shaft portion 53 extends through a tubular sleeve 56, and an intermediate liner of resilient material 58, such as silicone rubber, is bonded to the intermediate shaft portion 53 and the sleeve 56 for supporting the shaft 50 to avoid any lateral movement or vibration.

Figure 4:
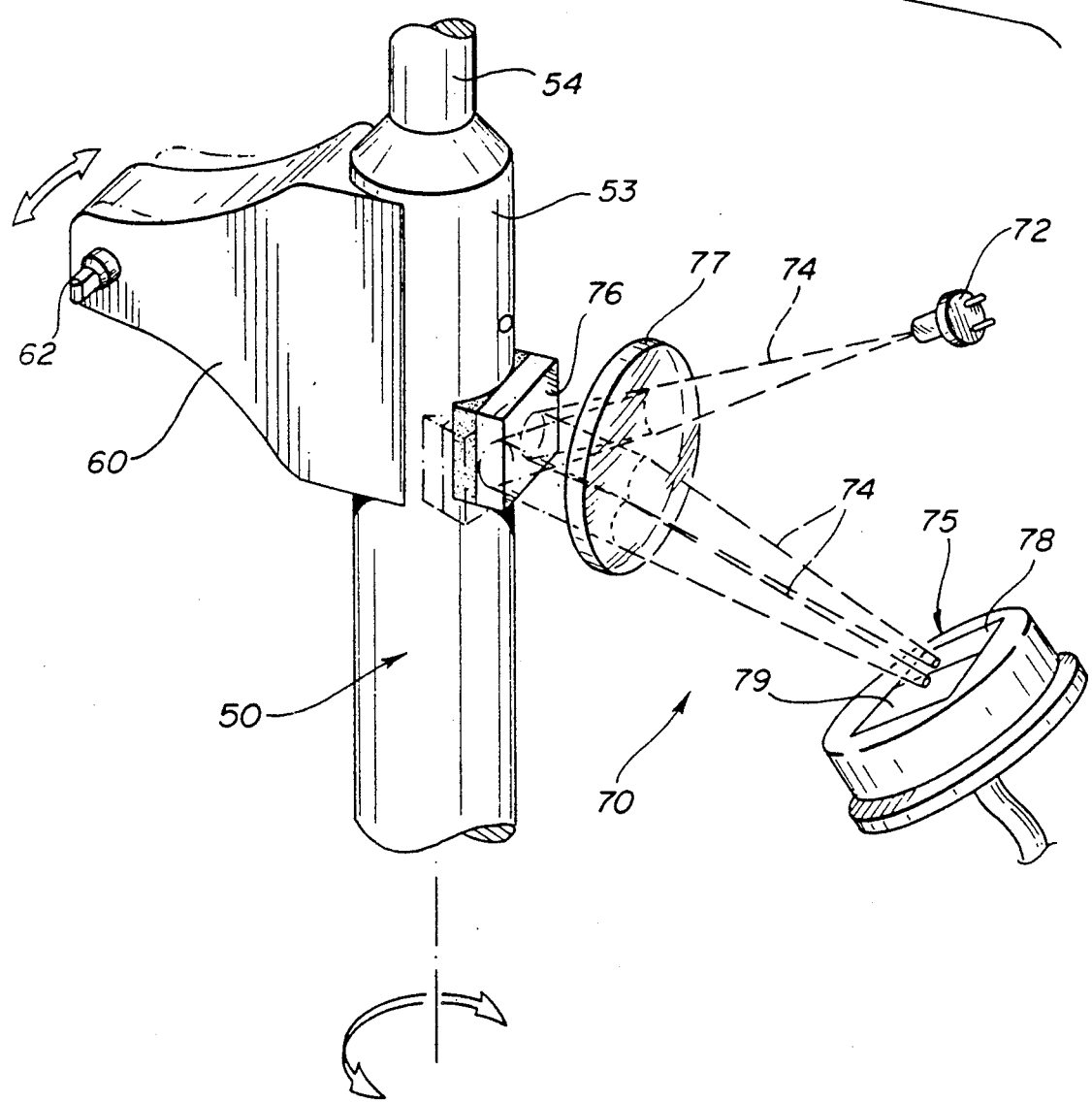
FIG. 4 is a perspective schematic view illustrating the illuminator means and the light beam detecting means of the present invention sensing the movement of the shaft supporting the engraving stylus of FIG. 2.
Figure 5:
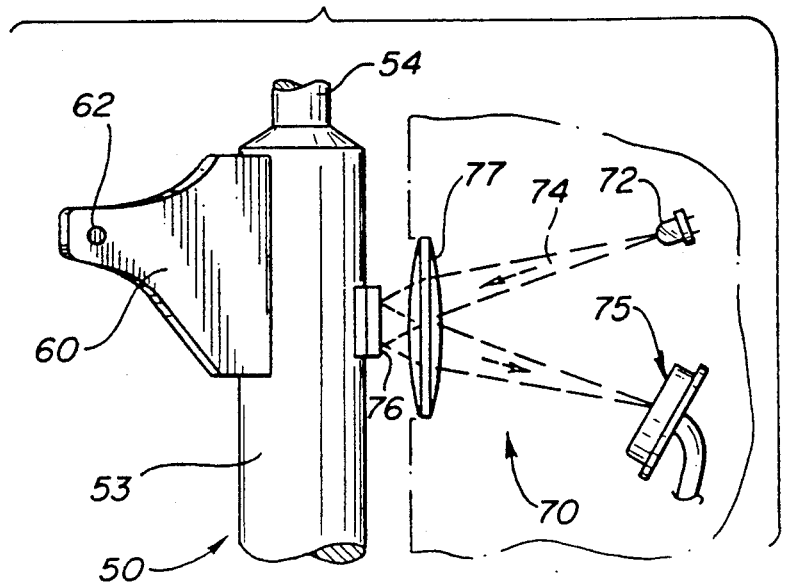
FIG. 5 is a schematic side elevational view illustrating the illuminator means and the light beam detecting means of the present invention sensing the movement of the shaft supporting the engraving stylus of FIG. 2.
Figure 6:
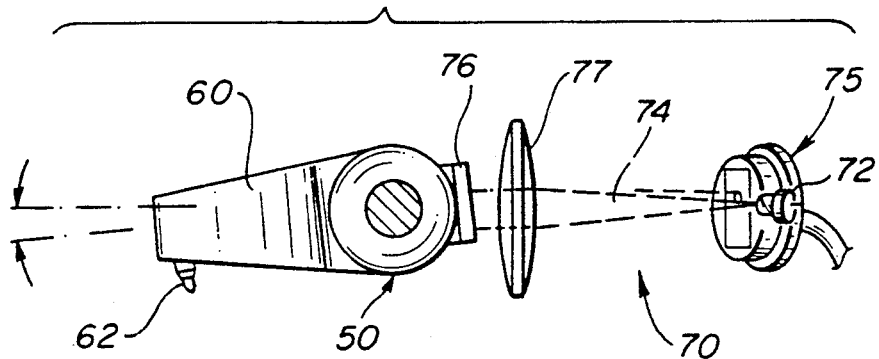
FIGS. 6 and 7 are schematic plan views illustrating the illuminator means and the light beam detecting means of the present invention sensing the movement of the shaft supporting the engraving stylus of FIG. 2.
Figure 7:
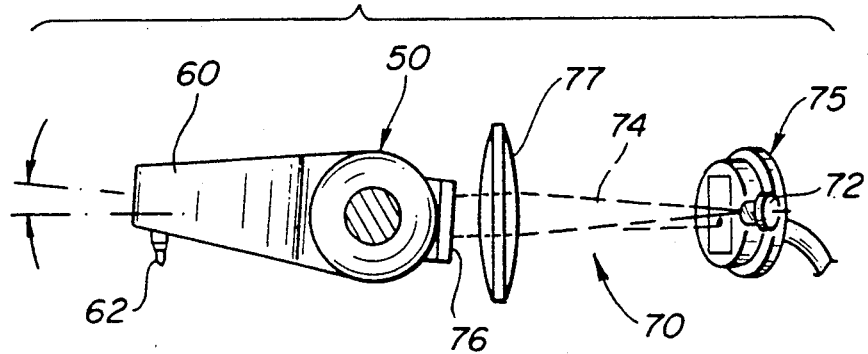

An actuator arm 60 is secured within a notch in the intermediate portion 53 of the shaft 50 by suitable means, such as a set of screws (not shown). A transverse hole is formed within the actuator arm 60 and an elongated rod-like holder 61, shown in FIG. 4, is disposed within the hole. A cutting stylus 62, preferably formed of diamond, is cemented onto one end of the holder 61. The cutting stylus 62 serves to cut or engrave cells or lines into the outer surface 22 of the cylinder 20. As shown in FIG. 1, a suction hose 43 is provided connected to an opening in the back wall of the cast metal housing 40 for removing chips from the stylus 62 as the chips are produced.

Figure 3:
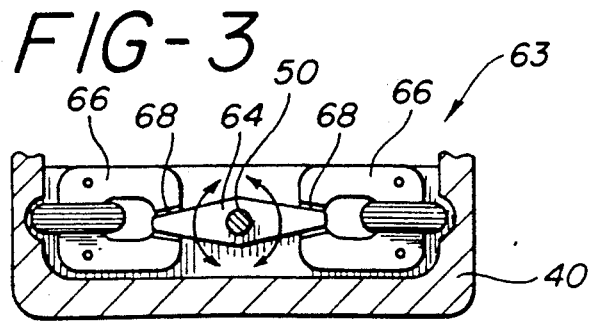
FIG. 3 is a view partially in section and on an enlarged scale showing a portion of the drive means associated with the printing head of FIG. 1 taken along section line 3—3.

Referring to FIGS. 2 and 3, a drive means 63 is provided for producing angular oscillatory movement of the shaft 50 about its axis. The drive means 63 includes an armature 64 which is rigidly secured to the shaft 50 and projects outwardly between a pair of opposing electro-magnets 66. The electro-magnets 66 are mounted within the base portion of the housing 40 and cooperate with the armature 64 to define air gaps 68. When the magnets 66 are energized by an alternating current, the intermediate shaft portion 53 and actuator arm 60 oscillate through an arc of approximately 0.25 degree and at a frequency between 2,500 and 7,000 cycles per second. The preferred operating frequency being between 2,500 and 5,500 cycles per second. This oscillation results in vibrating or moving the cutting stylus 62 by a maximum distance of about 100 microns.

The engraving apparatus of the present invention includes a control system for monitoring and controlling the angular oscillatory movement of the shaft 50 to substantially eliminate variations which would otherwise occur in the corresponding movement of the cutting stylus 62. Referring to FIGS. 2 and 4-8, the control system includes a position sensor means 70 associated with the shaft 50 for sensing the angular movement of the shaft 50 and generating a shaft position signal representative of the movement. The position sensor means 70 preferably includes an illuminator means, such as a Light Emitting Diode (LED) light source 72, located adjacent the shaft 50 within the housing 40 for producing a beam of light 74 and directing the beam 74 toward the shaft 50. A reflector means, such as a mirror 76, is mounted onto the intermediate portion 53 of the shaft 50 for receiving the beam of light 74 and directing the beam of light 74 away from the shaft 50. Located adjacent the shaft 50, within the housing 40, is a light beam detecting means 75 for sensing the position of the beam 74 as it strikes the same. A lens means, such as a convex lens 77, may be provided for gathering and focusing the light beam 74 directed from the light source 72 onto the mirror 76, and further gathering and focusing the light beam 74 reflected from the mirror 76 onto the light beam detecting means 75. The lens 77 may be positioned within the housing 40 with the mirror 76 to one side thereof and the illuminator means 72 and the light beam detecting means 75 on a second side thereof.

Referring to FIGS. 4 and 8, the light beam detecting means 75 preferably comprises first and second light beam detectors 78 and 79, respectively, positioned adjacent to one another. As shown in FIGS. 4-7, as the shaft 50 moves back and forth about its axis, the reflected light beam 74 coming off the mirror 76 will likewise move back and forth upon the first and second light beam detectors 78 and 79. The size of the beam of light 74 striking the detectors 78 and 79 is preferably large enough so that at least a portion of the beam 74 will almost always be striking each detector 78 and 79 as the shaft 50 moves back and forth about its axis. The first light beam detector 78 senses the magnitude of that portion of the light beam 74 that strikes it and generates a first light beam position signal representative thereof. Likewise, the second light beam detector 79 senses the magnitude of that portion of the light beam 74 that strikes it and generates a second light beam position signal representative thereof. As will be discussed in more detail below, the first and second light beam position signals from each of the first and second light beam detectors 78 and 79, respectively, are processed by the control circuitry of FIG. 8, which may be incorporated within the engraving head 10 in order to limit noise pickup by the circuitry. It should be apparent that alternative packaging arrangements could be utilized for housing the circuitry of FIG. 8. The two signals from the detectors 78 and 79 are processed by the control circuitry of FIG. 8 to control the power supplied to the light source 72 and to produce the shaft position signal A representative of the angular movement of the shaft 50, which is supplied to a control unit 80, shown in FIGS. 1 and 2.

As discussed above, the power supplied to the light source 72 is controlled by employing the first and second light beam position signals from the first and second light beam detectors 78 and 79. The light source 72 is monitored via the detectors 78 and 79 in order to assure that the first and second light beam position signals generated by the first and second light beam detectors 78 and 79 for each given position of the shaft 50 are essentially constant over time. Referring to FIG. 8, the first and second light beam position signals from the first and second light beam detectors 78 and 79 are first amplified by amplifiers 90 and 91 and subsequently sent to an illuminator feedback circuit 92. The feedback circuit 92 adds the two signals in a summing amplifier 94. The resulting sum is passed to a comparator 96 which compares the sum with a predetermined reference value. If the sum or added value of the first and second light beam position signals differs from the predetermined reference value, the comparator 96 generates an error signal representative of the difference. The error signal from the comparator 96 is then used to modify the nominal drive level for the light source 72 defined by Vls such that the amplifier 98 drives the light source 72 with sufficient power to maintain the total light supplied to the detectors 78 and 79 at a substantially constant level.

As discussed above, the first and second light beam position signals generated by the first and second light beam detectors 78 and 79 may be employed to produce a shaft position signal representative of the angular movement of the shaft 50. Referring to FIG. 8, the first and second light beam position signals from the first and second light beam detectors 78 and 79, after first being amplified by the amplifiers 90 and 91, are passed to light beam comparison means comprising a differential amplifier 99. The amplifier 99 produces as its output signal the shaft position signal A representative of the angular movement of the shaft 50, which is sent to the control unit 80. As will be discussed in further detail below, the shaft position signal A is employed by the circuitry shown in FIG. 9 to control the angular oscillatory movement of the shaft 50 to substantially eliminate variations which would otherwise occur in the corresponding movement of the cutting stylus 82.

FIG. 9 illustrates circuitry which may be housed in the control unit 80 or in other alternative packaging arrangements and includes a drive feedback control means 100 for controlling the angular oscillatory movement of the shaft 50. The feedback control means 100 is connected to the position sensor means 70 which generates the shaft position signal A, a signal generator means 102 which generates a reference drive signal, and a video signal means 104 which generates a drive signal representative of information to be engraved into the outer surface 22 of the cylinder 20. The video signal means employed by the present invention may be similar to the one set forth in U.S. Pat. No. 4,451,856, the disclosure of which is hereby incorporated by reference. As will be further discussed below, the feedback control means 100 generates a corrected drive signal in response to the shaft position signal A, the reference drive signal and high frequency portions of the video drive signal in order to control the angular oscillatory movement of the shaft 50. The corrected drive signal generated by the feedback control means 100 is then combined with the video drive signal and a damping signal to produce an engraver drive signal for actuating the drive means 63.

Selector means illustrated as a switch 69 is provided for allowing an operator to select whether to have the feedback control means 100 employed to control the angular oscillatory movement of the shaft 50 or not. If the feedback control means 100 is not employed, the reference drive signal, the video signal and the damping signal will be combined to produce an engraver drive signal for actuating the drive means 63.

Upon being received by the feedback control means 100, both the shaft position signal A and the reference drive signal are amplified by amplifiers 106 and 107, respectively, and subsequently sent to comparison means 108. When the cutting stylus 62 is working properly, i.e., there are no variations in the oscillatory movement of the shaft 50 and the cutting stylus 62, there is a fixed ratio between the amplitude of the shaft position signal A and the reference drive signal. When variations occur in the movement of the cutting stylus 62, the ratio between the amplitude of the shaft position signal A and the reference drive signal will change. This change in the ratio between the two signals is sensed in the comparison means 108, resulting in an error signal being produced by the comparison means 108.

In order to compare the shaft position signal A to the reference drive signal, the video content of the shaft position signal A must be blocked so that only the reference drive signal portion of the shaft position signal A is used in the amplitude comparison. A high pass filter 110 capable of allowing high frequency portions of a signal to pass therethrough while blocking low frequency portions of the same is used for this purpose. Since the video drive signal portion of the shaft position signal A normally has a much smaller frequency than the reference drive signal portion of the signal A, the video content of the shaft position signal A will be blocked when the signal A passes through the filter 110. A matching high pass filter 112 is also employed for the reference drive signal in order to balance out and cancel any attenuation, phase change or other effects of the high pass filter 110.

Gain set controls 109 and 111, each comprising a variable resistor means, such as a potentiometer, are employed to adjust the amplitude of the shaft position signal A and the reference drive signal when the apparatus is initially set up for each new engraving job. Both the shaft position signal A and reference drive signal are compared during set up for each job at a point beyond the high pass filters 110 and 112, to ensure that the amplitude of each is substantially equal. If one of the two signals has a larger amplitude than the other, the amplitude of the one is adjusted downwardly by increasing the resistance of its respective gain set control.

Since the size of a full cell of engraving is dependent on the peak amplitude of the shaft position signal A, both the shaft position signal A and the reference drive signal, after passing through the high pass filters 110 and 112, are passed to first and second peak-to-peak sensing means comprising peak-to-peak detectors 114 and 116, respectively. The first peak-to-peak detector 114 includes a positive peak detector 115a and a negative peak detector 115b for determining the positive and negative peak amplitudes, respectively, for the shaft position signal A. Each peak detector 115a and 115b produces a corresponding signal representative of the positive and negative peak amplitudes of the shaft position signal A. A differential amplifier 118 takes the difference between the positive peak signal and the negative peak signal produced by the peak detectors 115a and 115b, respectively, and produces a first peak-to-peak signal representative thereof. The second peak-to-peak detector 116 likewise includes a positive peak detector 117a and a negative peak detector 117b for determining the positive and negative peak amplitudes, respectively, for the reference drive signal. Each peak detector 117a and 117b produces a corresponding signal representative of the positive and negative peak amplitudes of the reference drive signal. A differential amplifier 120 takes the difference between the positive peak signal and the negative peak signal produced by the peak detectors 117a and 117b, respectively, and produces a second peak-to-peak signal representative thereof. The first and second peak-to-peak signals are sent to a comparator means comprising a comparator 122 including a differential amplifier 124 which takes the difference between the two signals and produces a signal which is then passed to an error integrator 126. For ease of description, the output of the integrator 126 will be referred to as the error signal even though it may also be referred to as an amplitude correction signal after integration.

A feedforward means 128 comprising an adjustable differentiator is connected to the video signal means 104. The feedforward means 128 serves to allow relatively high frequency portions of the video signal to pass therethrough in order to compensate for delay inherent in the feedback control means 100. The portion of the video signal that passes through the feedforward means 128 is combined with the error signal by a summing amplifier 130, resulting in the generation of a video corrected error signal or a modified amplitude correction signal.

An analog modulator 132 connected to the amplifier 130 and the signal generator means 102 is provided for modulating the amplitude of the reference drive signal through the application of the video corrected error signal to the modulator 132, resulting in the output of the corrected drive signal. The analog modulator 132 may comprise a device commercially available from Analog Devices, Model No. AD 532. By employing the video corrected error signal, the analog modulator 132 serves to correct the reference drive signal in order to remove any undesirable variations in the amplitude of the oscillatory movement of the shaft 50. Further, by employing such an analog modulator 132, control of the shaft 50 is ensured over a wide range of reference drive signals.

The control system of the present invention preferably includes electronic damping means 136 for reducing undesirable vibrations in the drive shaft 50 and the engraving stylus 62 resulting from a first mechanical resonance of the shaft 50, occurring between the spring portions 54 of the shaft 50. The damping means 136 includes a differentiator 138 connected to receive and differentiate the shaft position signal A to thereby generate a shaft velocity signal. A portion of the shaft velocity signal passes through a bandpass filter 139 which is centered upon the first resonant frequency of the shaft 50 to serve as a negative feedback damping signal which is combined with the corrected drive signal and the video signal for driving the shaft 50. The frequency and bandwidth characteristics of the bandpass filter 139 are matched to that of the shaft 50.

Engraver driver means 135 is connected to the analog multiplier 132, the damping means 136 and the video signal means 104. A band notch filter 140 may be provided between the video signal means 104 and the engraver driver means 135 to remove an upper frequency component of the video drive signal that corresponds to a second resonance associated with the shaft 50. Additionally, a second bandpass filter 142 and a D.C. feedback means 144 may further be employed and connected to the engraver driver means 135. The second bandpass filter 142 serves to remove residual ringing created from the first resonance of the shaft 50 and the D.C. feedback means 144 serves to generate a gain signal for establishing the overall gain of the engraving head 10. The engraver driver means 135 includes a summing amplifier 133 for combining the corrected drive signal, the video signal after it passes through the band notch filter 140, the negative feedback signal from the damping means 136, the gain signal from the D.C. feedback means 144 and the output signal from the second bandpass filter 142 with one another. The output from the amplifier 133 is sent to a power amplifier 134 which produces the engraver drive signal for actuating the drive means 63.

In practice, the control system of the present invention may be employed to monitor and control the oscillatory movement of the shaft 50 and further to act as an electronic damping means for the same. By employing the position sensor means 70, as shown in FIGS. 4-8, the angular movement of the shaft 50 may be monitored and a shaft position signal A generated which is representative of this movement. The feedback control means 100 may employ the shaft position signal A along with the reference drive signal and high frequency portions of the video signal to produce a corrected drive signal. The corrected drive signal, the video drive signal and the negative feedback signal created by the damping means 136 may be combined by the engraver driver means 134 to produce an engraver drive signal for actuating the drive means 63.

Having thus described the engraver head and the control system associated therewith in detail and by reference to a preferred embodiment thereof, it will be apparent that modifications and variations are possible without departing from the scope of the invention defined in the appended claims. For example, it is contemplated by this invention that, for some applications, delay in the feedback control means 100 may be insignificant and, as a result, the feedforward 128 means may be excluded. In such a situation, the error signal supplied by the comparison means 108 would be combined directly with the reference drive signal by the analog modulator 132 to produce the corrected drive signal. Further, it is contemplated that the feedback control means 100 may be employed without the damping control means 136 and visa versa.

What is claimed is:

1. Apparatus for engraving a surface of a workpiece comprising:
   an engraving tool;
   shaft means for supporting said tool adjacent said surface, said shaft means having a central axis;
   drive means for producing angular oscillatory movement of said shaft means about said central axis to effect corresponding oscillatory movement of said engraving tool;
   signal generator means for generating a reference drive signal;
   position sensor means associated with said shaft means for sensing the angular movement of said shaft means and generating a shaft position signal representative of said movement;

video signal means for producing a video drive signal representative of information to be engraved into said surface;

feedback control means connected to said signal generator means and said position sensor means, and responsive to said reference drive signal and said shaft position signal for generating a corrected drive signal; and engraver driver means connected to said video signal means and said feedback control means and responsive to said video drive signal and said corrected drive signal for producing an engraver drive signal for actuating said drive means.

2. Apparatus as claimed in claim 1 wherein said position sensor means comprises:

illuminator means positioned adjacent said shaft means for producing a beam of light and directing said beam toward said shaft means;

reflector means mounted to said shaft means for receiving said beam of light and reflecting said beam away from said shaft means; and light beam detecting means located adjacent said shaft means in a path of said reflected beam light for determining a position of said beam as said beam strikes said light beam detecting means and generating first and second light beam position signals representative thereof; and light beam comparison means connected to said light beam detecting means for comparing said first and second light beam position signals and producing said shaft position signal representative of said angular movement of said shaft means.

3. Apparatus as claimed in claim 2 wherein said position sensor means further comprises lens means for gathering and focusing said light beam directed from said illuminator means onto said reflector means and further gathering and focusing said light beam reflected from said reflector means onto said light beam detecting means.

4. Apparatus as claimed in claim 3 wherein said lens means is positioned with said illuminator means and said light beam detecting array means located on a first side of said lens means and said reflector means located on a second side thereof.

5. Apparatus as claimed in claim 3 wherein said lens means comprises one convex lens.

6. Apparatus as claimed in claim 2 wherein said light beam detecting means comprises:

a first light beam detector located in the path of said reflected beam of light for sensing a magnitude of a portion of said light beam which strikes said first light beam detector and generating said first light beam position signal representative thereof; and a second light beam detector located in the path of said reflected beam of light adjacent said first light beam detector for sensing a magnitude of a portion of said light beam which strikes said second light beam detector and generating said second light beam position signal representative thereof.

7. Apparatus as claimed in claim 6 wherein said position sensor means further comprises:

illuminator feedback control means connected to said illuminator means and said first and second light beam detectors for adding the first and second position signals, comparing an added value of said first and second position signals with a predetermined desired value, and controlling said illuminator means such that the added value of said first and second position signals is maintained substantially at said predetermined value.

8. Apparatus as claimed in claim 1 wherein said feedback control means comprises:

comparison means connected to said signal generator means and said position sensor means for comparing said shaft position signal and said reference drive signal to produce an error signal representative of a difference therebetween; and modulator means connected to said comparison means and said signal generator means for combining said error signal and said reference drive signal to produce said corrected drive signal.

9. Apparatus as claimed in claim 8 wherein said comparison means comprises:

first peak-to-peak sensing means connected to said position sensor means for determining peak-to-peak amplitudes of said shaft position signal and producing a first peak-to-peak signal representative thereof;

second peak-to-peak sensing means connected to said signal generator means for determining peak-to-peak amplitudes of said reference drive signal and producing a second peak-to-peak signal representative thereof;

comparator means connected to said first and second peak-to-peak sensing means for comparing said first and second peak-to-peak signals to produce said error signal.

10. Apparatus as claimed in claim 1, further comprising:

damping feedback means connected to said position sensor means and responsive to said shaft position signal for generating a negative feedback signal to provide damping for said shaft and said engraving tool; and said engraver driver means being further connected to said damping feedback means and further responsive to said negative feedback signal when producing said engraver drive signal for actuating said drive means.

11. Apparatus for engraving a surface of a workpiece comprising:

an engraving tool;

shaft means for supporting said tool adjacent said surface, said shaft means having a central axis;

drive means for producing angular oscillatory movement of said shaft means about said central axis to effect corresponding oscillatory of said engraving tool;

signal generator means for generating a reference drive signal;

position sensor means associated with said shaft means for sensing the angular movement of said shaft means and generating a shaft position signal representative of said movement;

video signal means for producing a video drive signal representative of information to be engraved into said surface;

feedback control means connected to said video signal means, said signal generator means and said position sensor means, and responsive to said video drive signal, said reference drive signal and said shaft position signal for generating a corrected drive signal; and engraver driver means connected to said video signal means and said feedback control means and responsive to said video drive signal and said corrected drive signal for producing an engraver drive signal for actuating said drive means.

12. Apparatus as claimed in claim 11 wherein said position sensor means comprises:
illuminator means positioned adjacent said shaft means for producing a beam of light and directing said beam toward said shaft means;
reflector means mounted onto said shaft means for receiving said beam of light and reflecting said beam away from said shaft means; and
light beam detecting means located adjacent said shaft means in a path of said reflected beam of light for determining a position of said beam as said beam strikes light beam detecting means and generating first and second light beam position signals representative thereof; and
light beam comparison means connected to said light beam detecting means for comparing said first and second light beam position signals and producing said shaft position signal representative of said angular movement of said shaft means.

13. Apparatus as claimed in claim 12 wherein said position sensor means further comprises lens means for gathering and focusing said light beam directed from said illuminator means onto said reflector means and further gathering and focusing said light beam reflected from said reflector means onto said light beam detecting means.

14. Apparatus as claimed in claim 13 wherein said lens means is positioned with said illuminator means and said light beam detecting array means located on a first side of said lens means and said reflector means located on a second side thereof.

15. Apparatus as claimed in claim 13 wherein said lens means comprises one convex lens.

16. Apparatus as claimed in claim 12 wherein said light beam detecting means comprises:
a first light beam detector located in the path of said reflected beam of light for sensing a magnitude of a portion of said light beam which strikes said first light beam detector and generating said first light beam position signal representative thereof; and
a second light beam detector located in the path of said reflected beam of light adjacent said first light beam detector for sensing a magnitude of a portion of said light beam which strikes said second light beam detector and generating said second light beam position signal representative thereof.

17. Apparatus as claimed in claim 16 wherein said position sensor means further comprises:
illuminator feedback control means connected to said illuminator means and said first and second light beam detectors for adding the first and second position signals, comparing an added value of said first and second position signals with a predetermined desired value, and controlling said illuminator means such that the added value of said first and second position signals is maintained substantially at said predetermined value.

18. Apparatus as claimed in claim 11 wherein said feedback control means comprises:
comparison means connected to said signal generator means and said position sensor means for comparing said shaft position signal and said reference drive signal to produce an error signal representative of a difference therebetween;
feedforward means connected to said video drive means for passing portions of said video signal therethrough;
amplifier means connected to said comparison means and said feedforward means for combining said portions of said video signal with said error signal to produce a video corrected error signal; and
modulator means connected to said amplifier means, and said signal generator means for combining said video corrected error signal and said reference drive signal to produce said corrected drive signal.

19. Apparatus as claimed in claim 18 wherein said comparison means comprises:
first peak-to-peak sensing means connected to said position sensor means for determining peak-to-peak amplitudes of said shaft position signal and producing a first peak-to-peak signal representative thereof;
second peak-to-peak sensing means connected to said signal generator means for determining peak-to-peak amplitudes of said reference drive signal and producing a second peak-to-peak signal representative thereof; and
comparator means connected to said first and second peak-to-peak sensing means for comparing said first and second peak-to-peak signals to produce said error signal.

20. Apparatus as claimed in claim 11, further comprising:
damping feedback means connected to said position sensor means and responsive to said shaft position signal for generating a negative feedback signal to provide damping for said shaft and said engraving tool; and
said engraver driver means being further connected to said damping feedback means and further responsive to said negative feedback signal when producing said engraver drive signal for actuating said drive means.

21. Apparatus for engraving a surface of a workpiece comprising:
an engraving tool;
shaft means for supporting said tool adjacent said surface, said shaft means having a central axis;
drive means for producing angular oscillatory movement of said shaft means about said central axis to effect corresponding oscillatory of said engraving tool;
signal generator means for generating a reference drive signal;
position sensor means associated with said shaft means for sensing the angular movement of said shaft means and generating a shaft position signal representative of said movement;
video signal means for producing a video drive signal representative of information to be engraved into said surface;
damping feedback means connected to said position sensor means and responsive to said shaft position signal for generating a negative feedback signal to provide damping for said shaft and said engraving tool;
engraver driver means connected to said video signal means, said signal generator means and said damping feedback means and responsive to said video drive signal, said reference drive signal and said negative feedback signal for producing an engraver drive signal for actuating said drive means.

22. Apparatus for engraving a surface of a workpiece comprising:
- engraving means positioned adjacent said surface for engraving said surface;
- drive means for producing angular oscillatory movement of said engraving means;
- signal generator means for generating a reference drive signal;
- position sensor means associated with said engraving means for sensing the angular movement of said engraving means and generating an engraver position signal representative of said movement;
- video signal means for producing a video drive signal representative of information to be engraved into said surface;
- feedback control means connected to said signal generator means and said position sensor means, and responsive to said reference drive signal and said engraver position signal for generating a corrected drive signal; and
- engraver driver means connected to said video signal means and said feedback control means and responsive to said video drive signal and said corrected drive signal for producing an engraver drive signal for actuating said drive means.

23. Apparatus for engraving a surface of a workpiece comprising:
- engraving means positioned adjacent said surface;
- drive means for producing angular oscillatory movement of said engraving means;
- signal generator means for generating a reference drive signal;
- position sensor means associated with said engraving means for sensing the angular movement of said engraving means and generating an engraver position signal representative of said movement;
- video signal means for producing a video drive signal representative of information to be engraved into said surface;
- damping feedback means connected to said position sensor means and responsive to said engraver position signal for generating a negative feedback signal to provide damping for said engraving means;
- engraver driver means connected to said video signal means, said signal generator means and said damping feedback means and responsive to said video drive signal, said reference drive signal and said negative feedback signal for producing an engraver drive signal for actuating said drive means.

* * * * *

UNITED STATES PATENT AND TRADEMARK OFFICE
CERTIFICATE OF CORRECTION

PATENT NO. : 5,029,011
DATED      : July 2, 1991
INVENTOR(S) : John W. Fraser

It is certified that error appears in the above-identified patent and that said Letters Patent is hereby corrected as shown below:

Column 4, line 60, "feedstock" should be --feedback--;

Column 14, line 49, "oscillatory of" should be --oscillatory movement of--;

Column 16, line 47, "oscillatory of" should be --oscillatory movement of--;

Column 18, line 3, "surface;" should be --surface for engraving said surface;"

In the Abstract, line 6, "aboout" should be --about--.

Signed and Sealed this

Nineteenth Day of January, 1993

Attest:

DOUGLAS B. COMER

Attesting Officer

Acting Commissioner of Patents and Trademarks